July 19, 1966  J. J. SCHOFIELD ETAL  3,261,294
CONTAMINANT SEPARATING FUEL PUMP

Filed Nov. 8, 1963  3 Sheets-Sheet 1

INVENTORS
JOHN J. SCHOFIELD
FRANCIS P. SCHIERBERL
BY *Aim Prentiss*
ATTORNEY

United States Patent Office 3,261,294
Patented July 19, 1966

3,261,294
CONTAMINANT SEPARATING FUEL PUMP
John J. Schofield, Glastonbury, and Francis P. Schierberl, West Hartford, Conn., assignors to Chandler Evans Inc., a corporation of Delaware
Filed Nov. 8, 1963, Ser. No. 322,307
10 Claims. (Cl. 103—5)

This invention pertains to liquid fuel pumps for aircraft engines, which comprise a centrifugal boost pump connected in flow series with a gear pump, both pumps being driven by a common drive shaft connected to the engine, and are usually inclosed by a common pump housing. More particularly, the invention relates to providing, as an integral part of the boost pump, novel means for removing from the fuel being pumped, contaminants that generally consist of a heterogeneous mixture of minute solid particles of road dust, silica sand and iron oxide, all of which cause severe erosion of the elements of the pump, and thereby reduce the operating effectiveness, efficiency, and life of the pump.

The problem of overcoming the deleterious effects of fuel contaminants in aircraft engine fuel pumps is one of long standing in the art, and the requirements for the solution of this problem have been increased in severity.

The prevailing methods and means heretofore employed to reduce the effects of contaminants in the fuel are to deny them entry into the pump, by means of barrier filters in the fuel supply line, or by centrifuges attached to the pump. The weight and spacial requirements of the pumping unit are thus increased, as are also the complexity and proneness to failure, by the addition of such means. Furthermore, barrier filters must be of large volume and weight to cope with large fuel flows for long periods of time, and these filters are subject to clogging which can seriously reduce the performance of the pump; or require a fuel bypassing arrangement to come into effect thereby causing the pump to be exposed to the full effect of the contaminants. Upon clogging there is also the danger of the collected contaminant being introduced into the main flow stream of the pump. Other methods of dealing with contaminants include the use of auxiliary centrifuges which are separate from the pump itself, and which separate the contaminant from the fuel prior to entry into the pump. Upon clogging or failure of these devices there is the danger of the collected contaminant being introduced into the main flow of the pump.

Our invention offers advantages over methods and means now in use, by eliminating weight and reducing special requirements of such additional equipment and does not increase the incidence of mechanical failure. It also removes the collected contaminant effectively from the path of the main flow of the pumping unit.

Our invention effectively solves the problem of dealing with contaminated fuels passing through fuel pumps, by modifying, in an original and novel manner, one part of the pump which is an integral component thereof. The invention retains the operational characteristics of the pump, despite contaminants introduced into the pump with the fuel, without the use of any additional moving parts.

Our invention makes use of the pumping element of the boost, which is a centrifugal impeller of conical shape, upon which there are open vanes that subject the fuel entering the pump to an increase in kinetic energy, and centrifugal force acting on the fuel.

As the fuel passes through the vanes of our boost pump a centrifugal force field is generated in the fuel, which causes the fuel to be thrown outwardly against the walls of the pump housing. The contaminant particles, being denser than the fuel, have greater momentum and are forced against the pump housing, thereby displacing the fuel in a zone adjacent to the housing walls.

At an optimum region along the axial length of the conical surface of the pump housing, the high energy contaminate particles are trapped, with a small amount of fuel, in a concentric annulus designed for this purpose, thereby removing the particles from the main flow stream of the pump. The resulting slurry is then bled from the annulus, and the slurry is either filtered and the fuel is returned to the flow system, or the slurry is discarded.

Our invention uses a trapping annulus, located in the housing at an optimum axial position along the impeller between its inlet and discharge outlet and withdraws a slurry of contaminant and fuel from the flow paths of the pump.

One advantage obtained by using the impeller of the boost pump, in conjunction with our contaminant trapping annulus, is that a smaller filter is required, since the entire fuel flow through the pump need not be treated, and the amount of contaminant in the main flow stream is reduced or eliminated completely, depending upon the effectiveness of the design of our modified impeller and trapping annulus.

Our invention departs from previous approaches to the problem protecting fuel pumps, by elimination of all means external to the pump for separating the contaminant from the fuel passing through the pump.

Our invention not only requires a smaller filter because the filter does not pass the full fuel flow through the pump, but in the event the filter becomes plugged, the main flow stream will not be affected. Furthermore, the contaminant separating feature of our invention need not be disassembled for cleaning.

The objects and results achieved by our invention include the following:

(A) The pumping impeller utilizes a naturally generated centrifugal force field acting upon the fuel passing through a conical shaped impeller of a boost pump, to separate a slurry of the undesirable contaminants and a small amount of fuel from the main fuel stream flowing through the pump, and trapping it in a concentric annulus placed in an optimum position along the axial extent of the impeller, so that the slurry can be removed.

(B) The plugging of the filter has no adverse effect on the main fuel flow stream through the pump.

(C) No bypass fuel flow system is required.

(D) No additional rotating parts are required.

(E) The collected contaminant particles remain outside the main fuel stream of the pump.

(F) No disassembly of the impeller is required to clean out the contaminant from the pump.

(G) The contaminant is removed from the main flow stream of the pump with low losses of efficiency or fuel.

With the foregoing and other objects in view which may be incidental to our improvements, our invention comprises the combination and arrangement of elements as hereinafter described and illustrated in the accompanying drawings in which.

Figure 1:
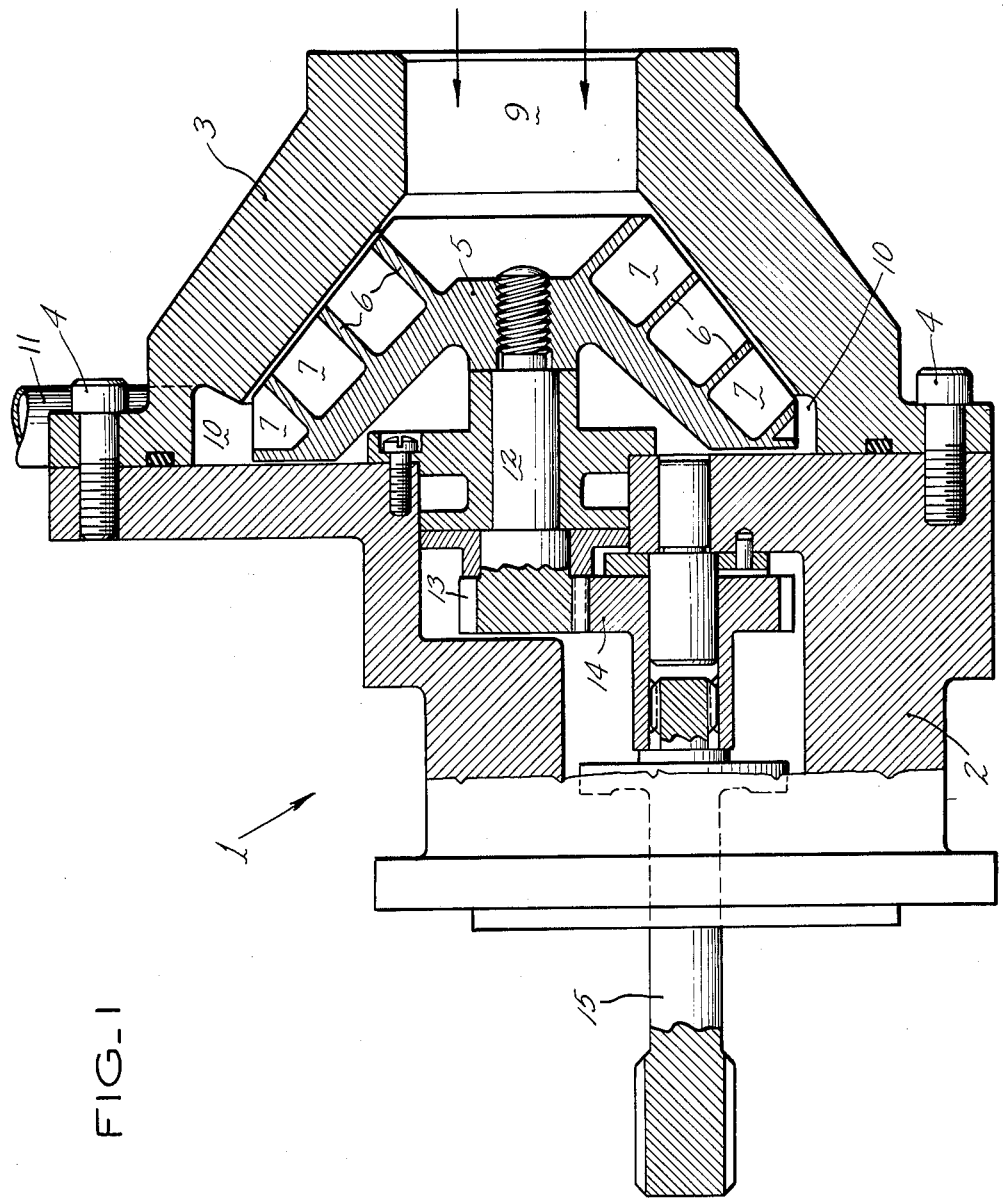
FIGURE 1 is a longitudinal section of a fuel boost pump, as heretofore used in the prior art.

Referring to FIGURE 1, the reference numeral 1 denotes generally the body (shell) of a prior art fuel boost pump which comprises a base portion 2 and a cover portion 3, clamped in fluid-tight contact by a plurality of bolts 4. Rotatably mounted in cover portion 3 is a frusto-conical impeller 5 having a plurality of concentric, helical vanes 6 which extend outwardly at right angles from the frusto-conical wall of the impeller 5. Each adjacent pair of vanes defines a fuel channel 7 through which the fuel flows from inlet passage 9. Upon rotation of impeller 5, vanes 6 impart a rotary motion to the liquid fuel in channels 7, and the resulting centrifugal force acting on the fuel forces it radially outward toward the wall of cover portion 3, which deflects the fuel downwardly, through an annular clearance between the vanes 6 and cover 3, into an annular discharge passage 10, from which it is discharged from the boost pump 1 through an outlet 11.

Impeller 5 is attached to and rotated by a spindle 12, to the lower end of which is fixed a gear 13 that meshes with a mating gear 14, rotated by a drive shaft 15, which is connected to a gear pump 16 (FIGURE 5), driven by the engine (not shown), to which the pump 1 supplies fuel. Heretofore, the sole purpose of a boost pump (as shown in FIGURE 1), was to draw fuel from a supply tank (not shown) and feed it to a gear pump (as shown at 16 in FIGURE 5), which in turn supplied the fuel to the engine.

Figure 2:
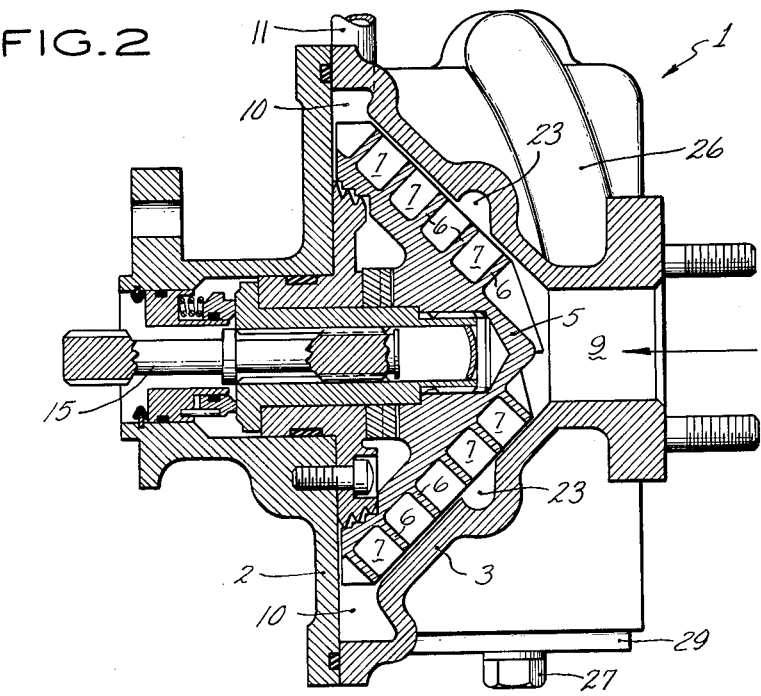
FIGURE 2 is a longitudinal section of the boost pump of FIGURE 1, after modification according to our invention.

FIGURE 2 shows the boost pump of FIGURE 1 after modification, in accordance with our invention, to provide means for removing from the pumped fuel solid particles of contaminants suspended therein, as described more particularly hereinbelow. In FIGURES 1 and 2, the same parts are denoted by the same reference numerals.

Figure 3:
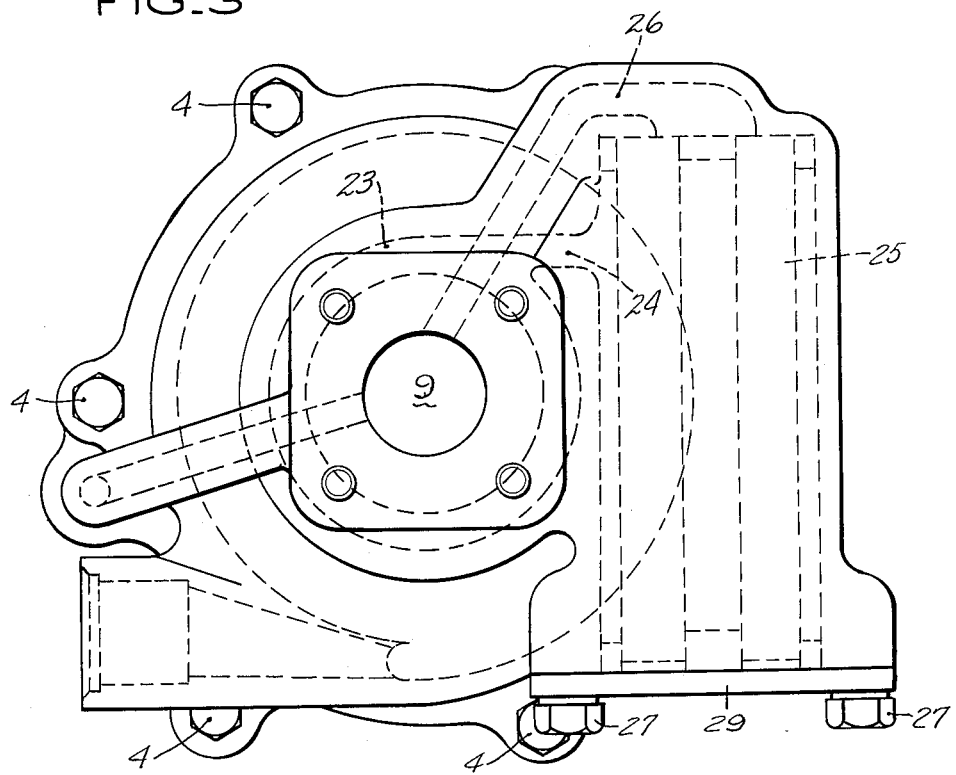
FIGURE 3 is an elevational view of the boost pump as viewed from the right hand end of FIGURE 2.
Figure 4:
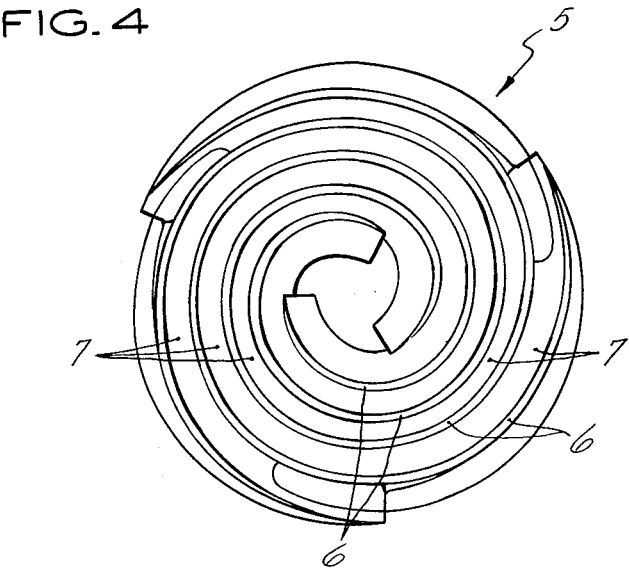
FIGURE 4 is an elevational view of the impeller of the modified pump shown in FIGURE 2.
Figure 5:
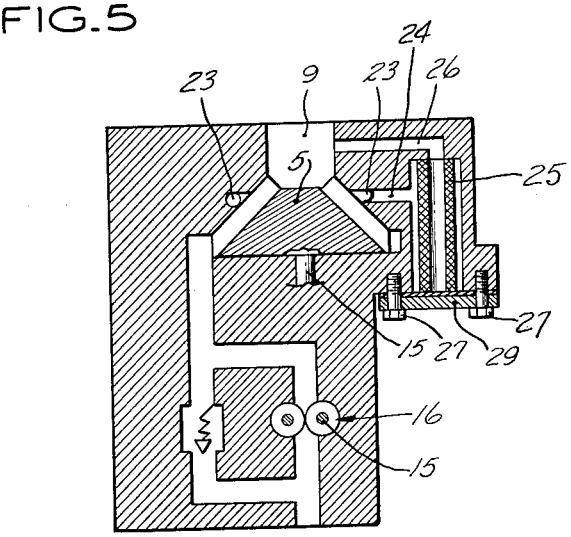
FIGURE 5 is a schematic sectional view of the whole fuel pumping unit of our invention, showing the relation of the boost pump stage to the gear pump stage.

As shown in FIGURES 2, 3 and 4, the vanes 6 of the pump are integral with the outer conical wall of the impeller 5, and extend outwardly from said wall, helically around the periphery thereof, as shown in FIGURES 3 and 4. Each vane 6, as shown in FIGURES 3 and 4, has a helical pitch over the course of its helical path along the outer conical wall of the impeller 5. Each vane 6 traverses an uninterrupted helical path along the complete outer conical wall of the impeller 5 starting at the inlet 9 and terminating at the outlet 11. Each adjacent pair of vanes 6 defines an intervening helical channel 7, through which fuel flows from inlet 9 through discharge passage 10 and outlet 11, to gear pump 16 (FIGURE 5).

As it moves along the passages 7, formed by the vane 6, of the impeller 5, the fuel containing the suspended contaminants experiences an increase of speed, and a centrifugal force field is generated. The contaminant particles, being denser than the fuel attain a higher momentum which causes them to move outwardly away from the axis of rotation of the impeller 5, and displaces the fuel in the clearance between the impeller 5 and the housing wall of cover 3.

As the contaminated fuel passes peripherally along the outside of the impeller 5, the slurry of contaminant and fuel nearest the housing wall is trapped by an annulus 23 of critical size, shape and location. The slurry is then bled from the annulus 23, through a passage 24 (FIGURES 3 and 5), which is tangential to the outer circumference of the annulus 23, and is disposed of as desired, usually through a filter 25 which separates the remaining fuel from the contaminant. The separated fuel is then returned through a passage 26 to its main flow stream (FIGURE 5), at some convenient point near the inlet 9.

We have discovered that the size, shape and location of the contaminant-trapping annulus 23 are of critical importance to the effective and efficient separation of the solid contaminant particles from the liquid fuel. As will be noted from FIGURE 2, the annulus 23 is of modified circular cross-section with a maximum width that somewhat exceeds the width of each passageway 7, and a maximum depth somewhat less than the depth of said passageway, so that the cross-sectional area of annulus 23 is approximately equal to that of each channel 7. The axis of annulus 23 is located at a point opposite to a point approximately one-third of the length of the fuel flow path, from its inlet 9 to discharge outlet 10.

The cross-sectional size, shape and the location, of the contaminant trapping annulus 23, as shown in FIGURE 2 (and as just described), are determined empirically for each particular design of boost pump, by selectively varying these factors and observing the results obtained, in terms of the percentage of total solid contaminants that is removed from the fuel stream by each particular combination of these factors. The particular combination that removes the highest percentage of contaminants is then selected for the particular design of boost pump involved.

It will be noted from FIGURE 5 that only a minor fraction of the fuel flowing through impeller 5, is diverted by annulus 23, and flows through the filter 25 by way of passages 24 and 26. Hence, filter 25 is much smaller than a prior art filter, through which passes the entire flow of pump fuel; and the useful life of filter 25 is correspondingly longer.

It will be further noted from FIGURE 5 that the contaminants collected upon the outer surface of filter 25 are wholly removed from the main stream of fuel flowing through the impeller 5, and that said contaminants can not reenter the fuel stream. When filter 25 becomes clogged by the gradual accumulation of contaminants on its outer surface, the filter can be removed by unscrewing bolts 27, and detaching cover plate 29 and replacing the old filter with a new one, without disassembling the boost pump.

From the above description of our invention, it is clear that it provides a simple, economical and effective solution of the problem of dealing with solid particulate contaminants in fuel supplied by a fuel pump to an engine; and achieves the objects and results (A)—(G) set forth in column 2.

Our invention is simple and economical, since it requires no additional equipment to be added to the fuel pumping unit, nor any extra moving parts in the pump. On the contrary, our invention requires only the provision of our trapping annulus 23 in the cover portion 3 of the pump; and our smaller filter 25, which replaces the larger filter used in prior art fuel supply systems.

Our invention is an effective and efficient solution of the problem of dealing with contaminants in fuel pumped to engines, since it removes substantially all of said contaminants, within the body of the boost pump, before they pass through its impeller, and cause deleterious erosion in the pump.

While we have shown and described the preferred embodiment of our invention, we desired it to be understood that we do not limit it to the precise details of construction and arrangement of elements, disclosed by way of illustration, since these can be changed and modified by those skilled in the art, without departing from the spirit of our invention or exceeding the scope of the appended claims.

We claim:

1. A centrifugal pump, for liquid fuel containing suspended solid particles of contaminants, having a pumping chamber, formed by a housing and a rotating impeller mounted therein, a fuel inlet and outlet at opposite ends of said chamber; said impeller imparting to the liquid fuel in said chamber a rotary and an axial motion which generates a centrifugal force greater than the axial force such that said greater centrifugal force causes said solid particles to concentrate, with a minor fraction of the pumped fuel, to form a slurry, in a zone adjacent the inner surface of said housing; first means located in said zone, for trapping and separating said slurry, from the main stream of pumped fuel; and second means for ejecting said slurry from said pump, whereby the main stream of pumped fuel is freed from said solid contaminants.

2. A pump according to claim 1, wherein said first means comprises an annular groove in said housing, communciating with said pumping chamber, and located upstream of the mid-point of the flow path of the pump fuel passing through said pumping chamber.

3. A pump according to claim 2, wherein said groove has an arcuate cross-section, whose base is aligned with the inner surface of said housing and whose width is greater than its depth.

4. A pump according to claim 2, wherein said second means comprises a bypass conduit connecting said groove with said fuel outlet whereby a minor fraction of the pumped fuel is returned to said inlet, and said bypass conduit contains a filter which separates the solid contaminant particles from the fuel in which they are suspended, whereby the fuel returned to the pump inlet is freed of said contaminants, and the percentage of contaminants in the whole stream of pumped fuel is substantially reduced.

5. A pump according to claim 4, wherein a portion of said bypass conduit is provided with a detachable cover, so that when said filter becomes clogged with contaminant particles, it can be removed and replaced by a fresh filter, without disassembling any other part of the whole pump.

6. In a fuel pump having a pumping chamber defined by a frusto-conical housing and a mating, rotating impeller mounted therein, with a relatively small running clearance therebetween, which forms a flow path for the pumped fuel flowing from an axially aligned fuel inlet to a peripheral outlet, at opposite ends of said chamber; said impeller having a plurality of helical vanes extending radially outward from its outer surface, each vane coursing from the inlet extremity to the outlet extremity of the outer surface of said impeller, with each adjacent pair of vanes forming an intervening helical channel, through which the pumped fuel flows from said inlet to said outlet, whereby said fuel is subjected to centrifugal force generated by the rotating mass of said fuel; an annular trapping groove in said housing, near its mid-region, into which a slurry, consisting of solid particles of contaminants suspended in a minor fraction of the pumped fuel, is concentrated by said centrifugal force; and an outer conduit, connecting said trapping groove with the outside of said pump, through which said slurry is removed from the main stream of fuel passing through said pump; whereby said main stream of pumped fuel is freed of said contaminants.

7. In a liquid fuel pumping unit for an aircraft engine comprising a centrifugal boost pump and a positive displacement pump, connected in flow series, between a source of fuel and the engine; means for removing solid particles of contaminants from the pumped fuel, during its flow through said pumping unit, comprising: a hollow, frusto-conical, boost pump impeller having on its conical wall a plurality of helical vanes whose outer ends are in closely-spaced relation to a mating frusto-conical housing enclosing said impeller, whereby said vanes and housing define a plurality of helical channels extending from the inlet to the outlet through which the pumped fuel flows from a central axial inlet to a peripheral circular outlet of said boost pump; driving means connecting said impeller with the engine so that said impeller is rotated at a speed proportional to that of the engine; thereby creating a centrifugal force which acts on the liquid in said channels and forces the denser solid contaminant particles radially outward toward said housing and downwardly along the inner surface of said housing, said solid particles, displacing an equal volume of liquid fuel inwardly toward the axis of rotation of said impeller; an annular trapping groove in said housing, in which said solid particles are trapped and separated from the main stream of pumped fuel; a bypass conduit connecting said trapping groove with the inlet to said boost pump, and a filter in said conduit for removing solid contaminant particles from the fuel flowing through bypass conduit, whereby the fuel returned to said inlet is freed of said solid contaminants, and the percentage of contaminants in the whole stream of pumped fuel is substantially reduced.

8. A centrifugal pump, for liquid fuel containing suspended solid particles of contaminant, having a pumping chamber, formed by a housing and a rotating impeller mounted therein, a fuel inlet and outlet at opposite ends of said chamber; said impeller imparting to the liquid fuel in said chamber a rotary motion which generates a centrifugal force that causes said solid particles to concentrate with a minor fraction of the pumped fluid to form a slurry in a zone adjacent the inner surface of said housing; first means located in said zone, for trapping and separating said slurry, from the main stream of the fuel; and second means for ejecting said slurry from said pump, whereby the main stream of pumped fuel is freed from said solid contaminants, said first means comprises an annular groove in said housing communicating with said pumping chamber, and located upstream of the mid-point of the flow path of the pump fuel passing through said pumping chamber, said groove having an arcuate cross-section whose base is aligned with the inner surface of said housing and whose width is greater than its depth, wherein the upstream junction of said groove with the inner surface of said housing forms an obtuse angle, and its downstream junction forms a sharp angle therewith, whereby the entrapment of solid contaminant particles in said groove is enhanced.

9. In combination, a pump having a pumping chamber formed by a housing and a rotating impeller mounted therein; an inlet and an outlet at opposite ends of said chamber, said impeller having a plurality of helical vanes of substantially uniform helical pitch secured to the outer surface of said impeller, each of said vanes extending continuously along said outer surface from said inlet to said outlet, said rotating impeller simultaneously imparting rotary and axial motion to fluid contained in said pumping chamber such that the centrifugal force generated by said rotary motion is sufficiently greater than the axial force generated by said axial motion to cause the particles of greater mass to concentrate in a zone adjacent the inner surface of said housing, said concentrated particles commingling with a portion of the contained fluid to form a slurry, means located in said zone for trapping said slurry and separating said slurry from the main portion of said confined fluid, and a conduit in fluid communication with said slurry trapping means so constructed and arranged that said slurry is ejected from said pump.

10. A pump as claimed in claim 9 wherein said trapping means comprises an annular groove in fluid communication with said pumping chamber.

References Cited by the Examiner

UNITED STATES PATENTS

| | | | |
|---|---|---|---|
| 1,420,665 | 6/1922 | Newcombe | 230—132 |
| 1,447,554 | 3/1923 | Jones | 230—120 |
| 2,289,474 | 7/1942 | Anderson | 230—133 |
| 2,688,925 | 9/1954 | Thoren et al. | 103—5 |
| 2,704,516 | 3/1955 | Mock et al. | 103—88 |
| 2,761,393 | 9/1956 | Di Stefano et al. | 103—88 |
| 2,845,870 | 8/1958 | Lock | 103—88 |
| 2,876,705 | 3/1959 | Aspelin et al. | 103—5 |
| 2,885,960 | 5/1959 | Deschamps | 103—220 |
| 2,891,481 | 6/1959 | Franklin et al. | 103—220 |

FOREIGN PATENTS 663,194   12/1951   Great Britain.

MARK NEWMAN, *Primary Examiner.*

W. J. KRAUSS, *Assistant Examiner.*